May 1, 1928. 1,667,903
N. PAINE
CORE BLOCK ASSEMBLING MACHINE
Filed Sept. 15, 1927 6 Sheets-Sheet 1
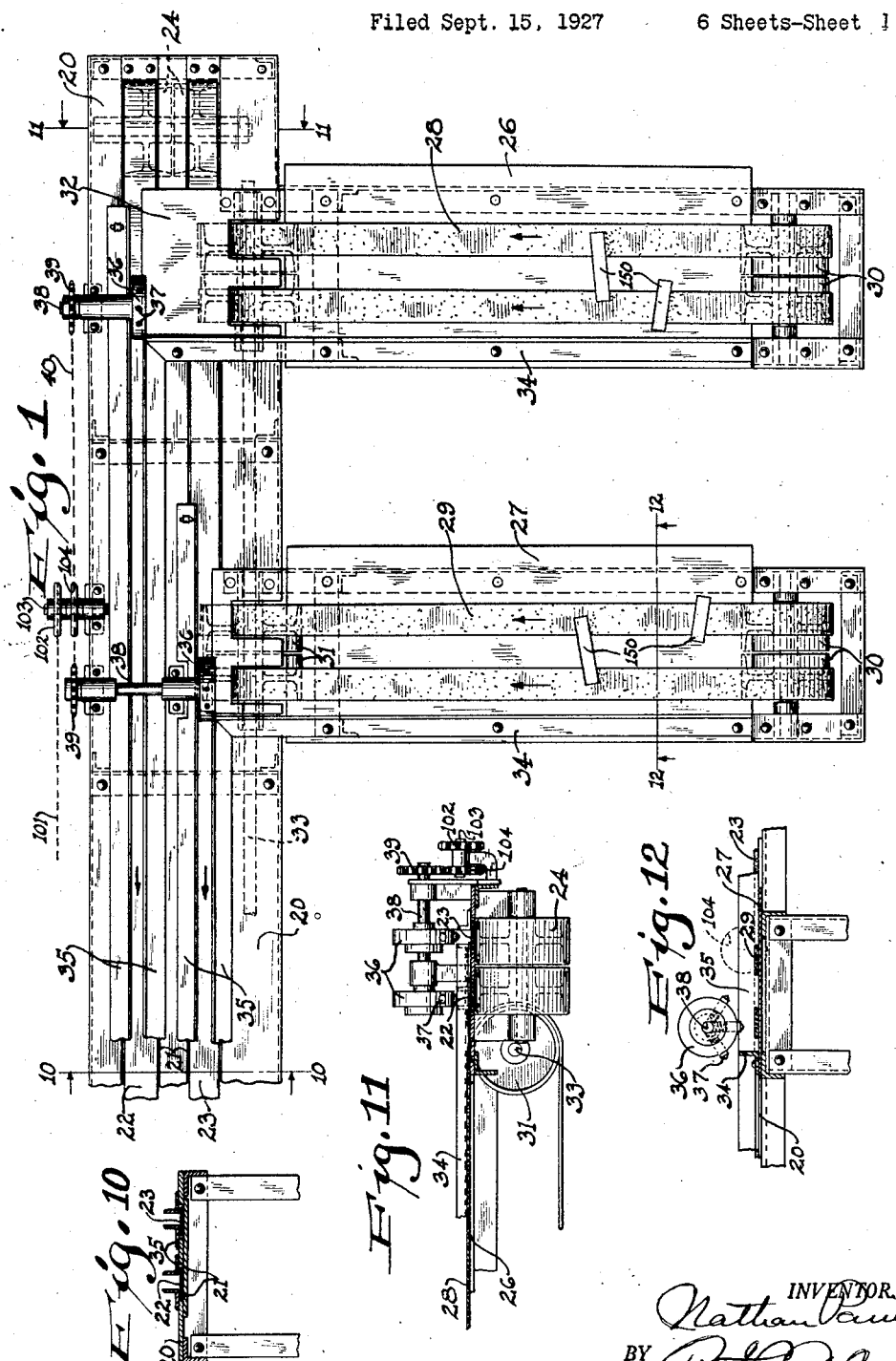
INVENTOR
Nathan Paine
BY
ATTORNEYS.
WITNESSES

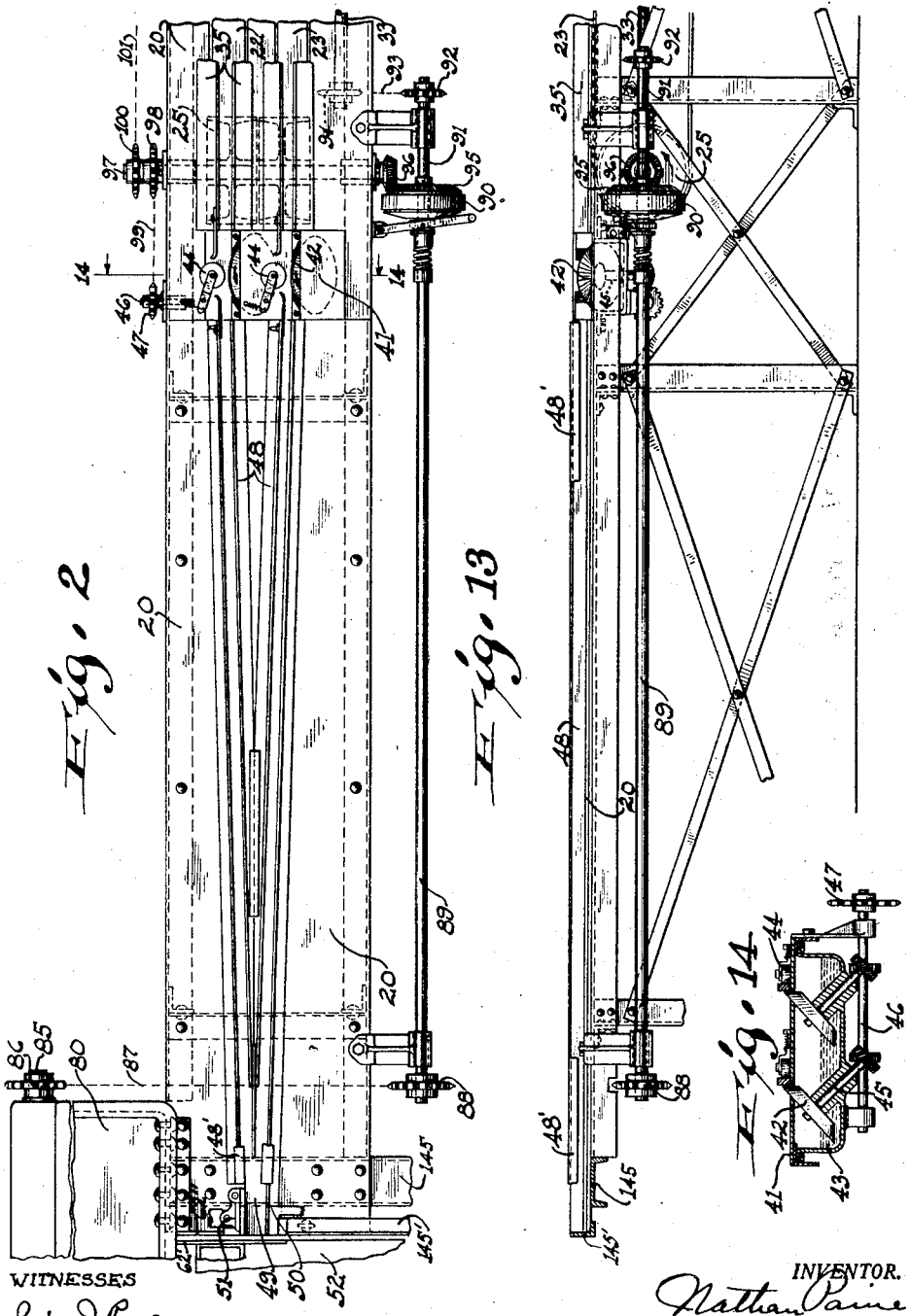

May 1, 1928. 1,667,903
N. PAINE
CORE BLOCK ASSEMBLING MACHINE
Filed Sept. 15, 1927 6 Sheets-Sheet 3
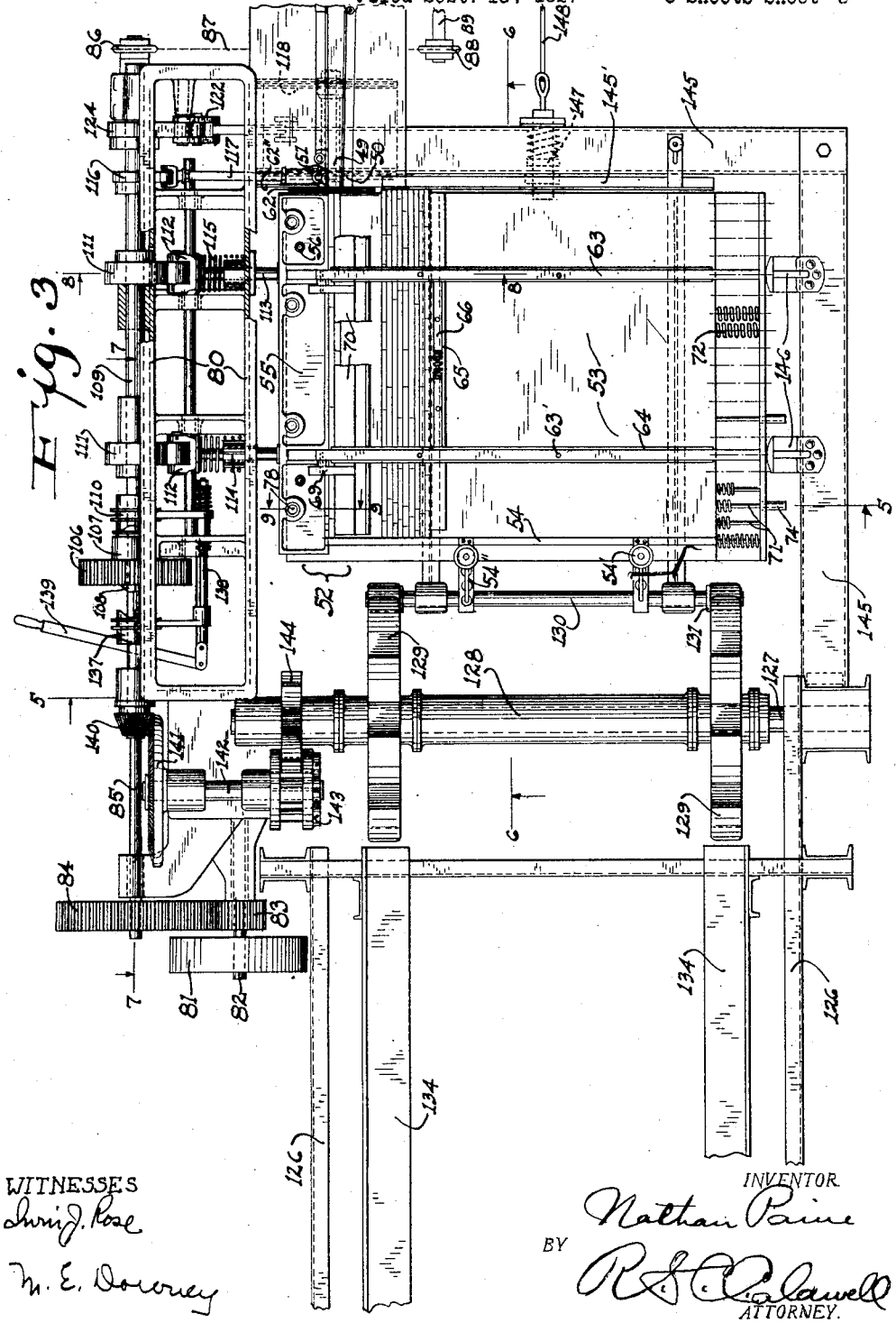
WITNESSES
Irving J. Rose
M. E. Downey
INVENTOR
Nathan Paine
BY
R. S. Caldwell
ATTORNEY.

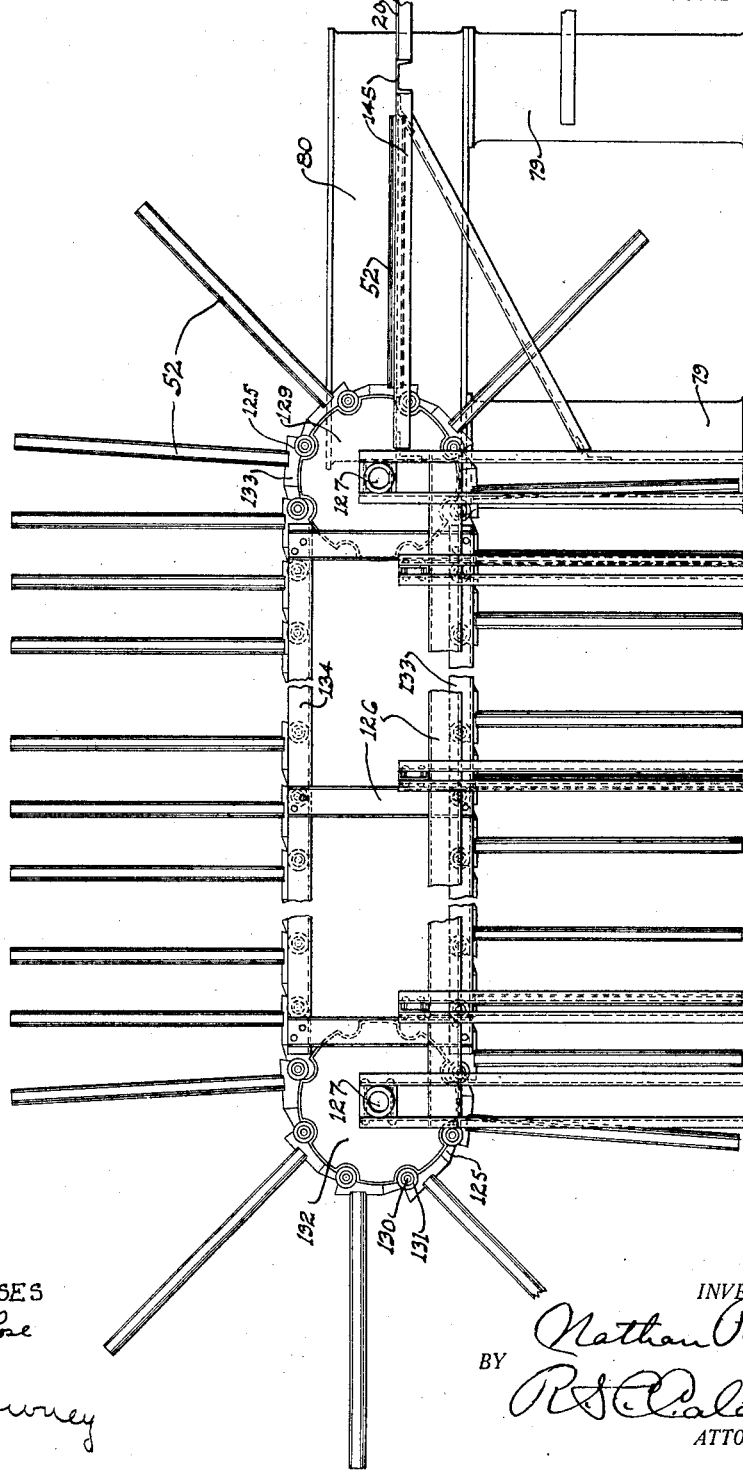

May 1, 1928.　　　　　　　　　　　　　　　　　　1,667,903
N. PAINE
CORE BLOCK ASSEMBLING MACHINE
Filed Sept. 15, 1927　　　6 Sheets-Sheet 5
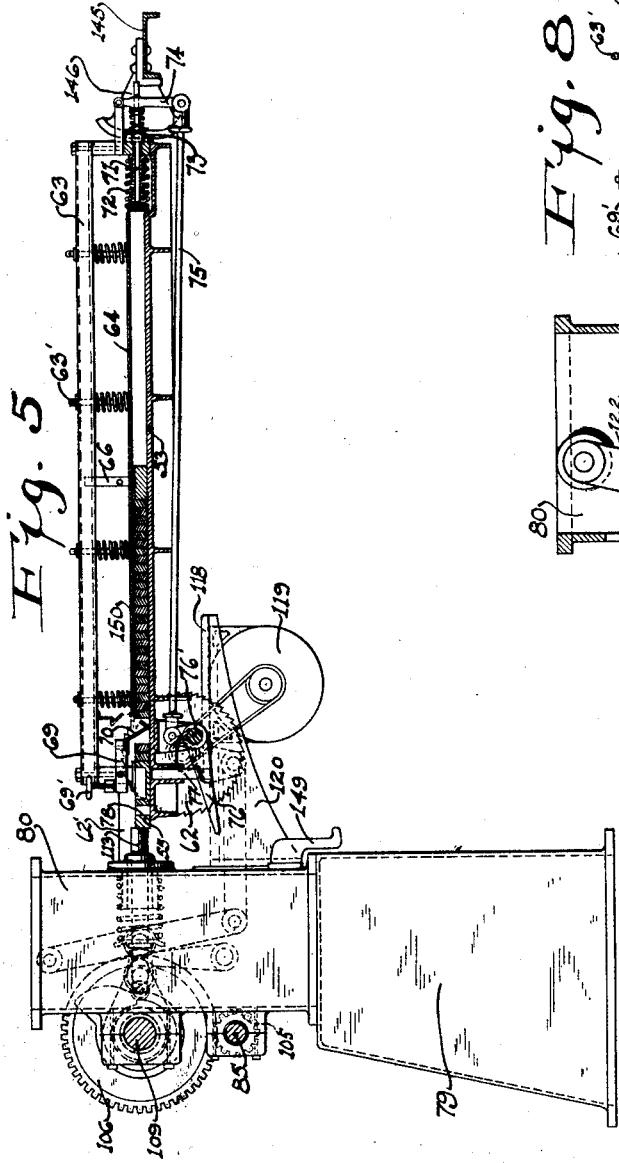
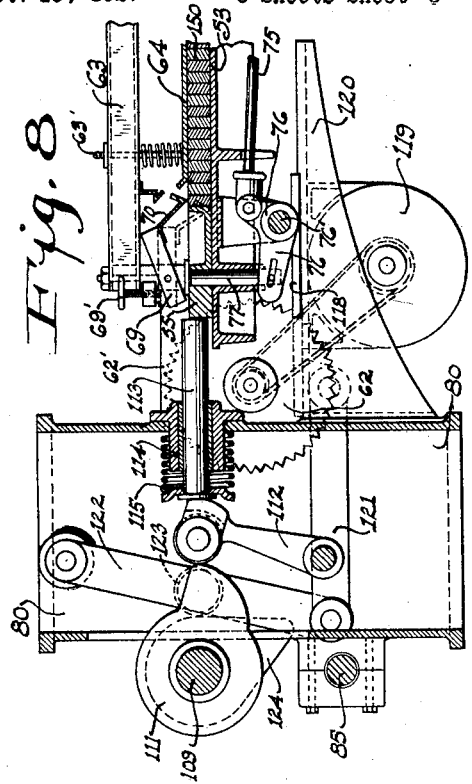
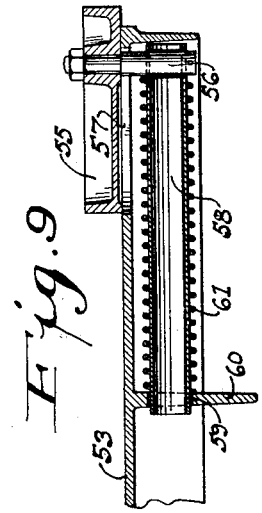
WITNESSES
　　　　　　　　　　　　　　　　　INVENTOR.
　　　　　　　　　　　　　　　Nathan Paine
　　　　　　　　　　　　BY
　　　　　　　　　　　　　　　　　　ATTORNEY.

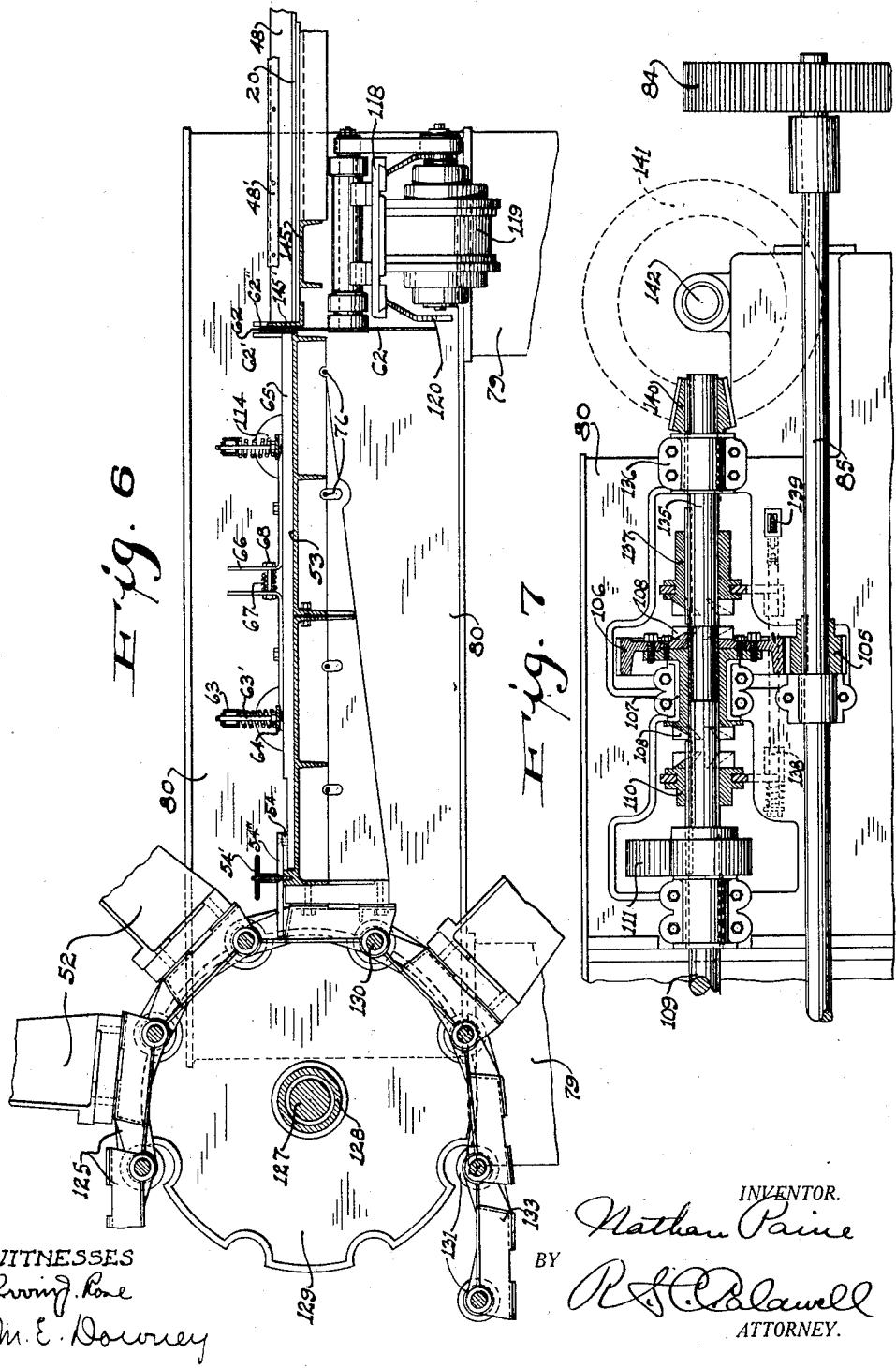

Patented May 1, 1928.

1,667,903

UNITED STATES PATENT OFFICE.

NATHAN PAINE, OF MIAMI BEACH, FLORIDA, ASSIGNOR TO MIRACLE DOOR COMPANY OF DELAWARE, OF OSHKOSH, WISCONSIN, A CORPORATION OF DELAWARE.

CORE-BLOCK-ASSEMBLING MACHINE.

Application filed September 15, 1927. Serial No. 219,766.

The invention relates to core block assembling machines and has for an object the provision of a machine by means of which blocks of wood left after sawing operations may be rapidly and expeditiously assembled and glued into cores for use in the manufacture of doors and other woodwork.

Another object of the invention is the provision of a machine of this character including a plurality of clamping trays cyclically movable to successive filling positions.

A further object is to provide a machine of this character in which the core blocks or work pieces are fed to the clamping tray in more than one row to facilitate gluing and preliminary clamping operations and to accelerate the tray-filling operation.

A further object of the invention is to provide a core block assembling machine including a tray co-operating with cam-operated cutting-off and displacing means operating on successive rows of work pieces.

A further object of the invention is to provide a machine of this character including clamping means acting on the work pieces projecting from the tray to facilitate the cutting-off or trimming operation.

A further object of the invention is to provide automatic means for locking the tray while the work pieces are under pressure, and a more specific object is to utilize the clamping pressure for operating the locking means.

The invention further consists in the several features hereinafter set forth and more particularly defined by the annexed claims.

In the accompanying drawings,

Fig. 1, 2 and 3 are plan views of successive portions of a core block assembling machine embodying the invention;

Fig. 4 is a side elevation of the tray carrier of the machine;

Fig. 5 is a transverse sectional elevation of the machine taken along the line 5—5 of Fig. 3;

Fig. 6 is a sectional elevation taken along the line 6—6 of Fig. 3;

Fig. 7 is a sectional elevation taken along the line 7—7 of Fig. 3;

Fig. 8 is a fragmentary sectional elevation taken along the line 8—8 of Fig. 3;

Fig. 9 is a fragmentary sectional elevation taken along the line 9—9 of Fig. 3;

Fig. 10 is a fragmentary sectional elevation taken on the line 10—10 of Fig. 1;

Fig. 11 is a fragmentary sectional elevation taken along the line 11—11 of Fig. 1;

Fig. 12 is a fragmentary sectional elevation taken along the line 12—12 of Fig. 1;

Fig. 13 is a fragmentary elevation of that portion of the machine shown in Fig. 2, and Fig. 14 is a sectional elevation taken along the line 14—14 of Fig. 2.

In these drawings the numeral 20 designates an elongated table conveniently formed of structural steel and having in its upper surface a pair of parallel shallow channels 21 in which are disposed the upper flights of conveyer belts 22 and 23 movable in the direction indicated by arrows, each belt being mounted on idle pulleys 24 at the end of the table and on driving pulleys 25 at an intermediate portion of the table. Spaced parallel feeder tables 26 and 27 extend at right angles to the table 20 near its outer end and carry thereon the upper flights of belts 28 and 29, respectively, for conveying core blocks or work pieces 150 to the table 20, these belts being mounted at their outer ends on pulleys 30 and at their inner ends on pulleys 31, which latter are disposed below the table 20. The feeder belts 29 are provided to carry work pieces to the conveyer belt 23, while the feeder belts 28 carry work pieces to the conveyer belt 22, and for this purpose the feeder table 26 which supports the belts 28 is provided at its inner end with a sheet metal extension 32, which passes over the conveyer belt 23 supplied from the other feeder table 27. The pulleys 31 supporting and driving the inner ends of the feeder belts 28 and 29 are rotated by a shaft 33, which is driven as hereinafter described to move the upper flights of the belts 28 and 29 in the direction indicated by arrows.

A guide angle 34 is secured to the top of each feeder table 26 and 27 at one side of the feeder belts and a pair of spaced parallel guide angles 35 are mounted back to back on the table 20 above each conveyer belt 22 and 23 to form a work-piece guiding channel above each of these belts. One of each pair of the guide angles 35 above each conveyer belt 22 and 23 is longer than its companion angle to form an abutment or stop for work pieces leaving the corresponding feeder table, and each of these stop-forming guide angles 35 is laterally adjustable to permit adjustment in the width of the guide channel above the conveyer belt. Above the conveyer belts 22 and 23 at the inner ends of their feeder tables are placed rotary kicker wheels 36, each including spring-pressed peripheral plungers 37, which serve to propel the work pieces coming from the feeder tables into the guide channels above the conveyer belts 22 and 23, thereby keeping these channels filled with work pieces in endwise abutment. The kicker wheels 36 are mounted on respective shafts 38 carrying sprockets 39 connected by a chain 40 which is driven as hereinafter described.

The guide channels formed by the angles 35 above the conveyer belts 22 and 23 communicate at their discharge ends with a gluing platform 41, where the moving work pieces engage the beveled periphery of glue rolls or wheels 42 dipping into a glue reservoir 43, the work pieces being laterally pressed against the glue rolls by spring-urged rollers 44. The glue rolls are mounted on respective shafts 45 disposed on an inclined axis and having a gearing connection with a driving shaft 46 by which the glue rolls are rotated in the direction indicated by arrows. The shaft 46 is provided with a sprocket 47, which is chain driven as hereinafter described.

The work pieces, after passing the glue rolls, enter guide channels formed by pairs of spaced angles 48 back to back, one of each pair being adjustable to permit of variation in channel width. One of each pair of the angles 48 carries guard angles 48' which project above the channels to prevent buckling of the rows of work pieces therein under the endwise pressure to which the work pieces are subjected.

The channels formed by the angles 48 converge to a common channel or passage 49, into which the two rows of work pieces enter side by side. This passage 49 may be sufficiently narrow to place the two rows of work pieces in lateral abutment and thereby effect their adhesion. One side of the guide channel 49 is formed by an angularly adjustable angle 50 and the other side is formed in part by a pivotally mounted clamp 51 which latter is periodically actuated by cam mechanism hereinafter described to effect the clamping of the work pieces within the channel 49.

The discharge end of the channel or passage 49 registers with the open side of one of a series of assembling trays 52 to load thereon successive double rows of work pieces. In the present instance each tray comprises a flat metal plate 53 re-enforced on its under side and carrying on its upper face, at the side opposite and distant from the clamping channel 49, an abutment strip or stop 54 which limits the forward movement of the rows of work pieces as they are fed onto the tray and places the ends of these rows in alignment. In order to vary the size of the core to be assembled on the tray 52 the abutment strip 54 is mounted for lateral adjustment by means including hand wheel nuts 54' engaging apertured arms 54'' extending laterally from the strip 54. At the end of the tray adjacent the discharge channel 49 and in parallel relation thereto is mounted a pusher bar 55, which is adapted for periodic lateral reciprocation, as hereinafter described, to laterally move successive rows of work pieces in order to provide room for following rows of work pieces directly in line with the discharge end of the channel 49. The pusher bar has secured thereto depending studs 56, each of which projects through a slot 57 in the tray plate 53, as seen in Fig. 9, and each being secured to one end of a tube 58, which has its other end slidably mounted in an opening 59 formed in a re-enforcing rib 60 of the plate. The tube 58 is surrounded by a compressed coiled spring 61 which is interposed between the rib 60 and the stud 56 and thus urges the stud-bearing pusher bar 55 to its rearward position, as shown in Fig. 3, in readiness for a forward displacement.

A circular saw 62, reciprocated as hereinafter described, is placed between the tray and the discharge end of the channel 49 to cut off the work pieces at the edge of the tray after each double row of work pieces is on the tray and before the lateral displacement of these rows by the pusher bar.

Spaced parallel tubular bars 63 extend lengthwise above the tray 52 in spaced relation thereto and each carries depending studs 63' which are spring urged downwardly and which support at their lower ends a presser strip 64 extending in parallel relation to the superposed bar 63. A follower bar 65 is slidably movable on the plate 53 in parallel relation to the pusher bar 55 to preserve the alignment of the displaced rows of work pieces. Angle bars 66 rest on the upper surface of the follower bar 65 in alignment therewith and have beveled ends engageable under the presser strip 64 by means of a spring 67 interposed between the bars and surrounding a connecting and guiding bolt 68, thereby frictionally retarding the follower bar. The upstanding portions of the angle bars 66 serve as hand holds to release the follower bar and thereby permit its free movement.

At the end portion of the tray 52 adjacent the pusher bar 55 are placed pivotally mounted arms 69 carrying a guide strip 70 disposed longitudinally adjacent the newly introduced rows of work pieces on the tray to prevent toppling over of these work pieces. The guide strip is momentarily lifted out of the way by the lateral displacement of the newly introduced rows of work pieces, and an adjusting screw 69' is provided to adapt the guide strip to different widths and heights of the work pieces.

At the end of the tray opposite the pusher bar 55 is mounted a plurality of parallel plungers 71 placed under pressure by surrounding coiled springs 72, the free ends of the plungers being adjusted to equal length by nuts 73 in order that the plungers may simultaneously engage the follower bar 65 when it reaches its final position after the tray is filled with work pieces. Some of the plungers 71 abut against depending levers 74, each of which is connected at its lower end to one end of a link 75 having its other end connected to one arm of a bell crank 76 disposed beneath the tray 52 below the pusher bar 55. The other arm of bell crank 76 is slotted for operative connection with an upstanding locking pin 77 which is slidably mounted in the tray 52 for entrance into a bore 78 formed in the pusher bar. The several bell cranks 76 are carried on a shaft 76'

Base pedestals 79 support an elongated housing 80 which is disposed laterally of the assembling tray 52 adjacent the end thereof receiving the pusher bar 55. A drive pulley 81 is keyed to a stud shaft 82 journalled in a projecting terminal portion of the housing and the shaft 82 carries a pinion 83 which meshes with a gear 84. The gear 84 is secured to one end of a shaft 85, which is journalled at several points along the side of the housing 80, the other end of the shaft carrying a sprocket 86 connected by the transmission chain 87 to another sprocket 88 secured to a shaft 89. The shaft 89 is supported from and extends longitudinally of the table 20, as seen in Figs. 2 and 13, and is provided with a clutch 90 by which it may be coupled at will to a coaxial shaft 91, the latter carrying a sprocket 92, which is connected by a transmission chain 93 to a sprocket 94 on the shaft 33, hereinbefore described, driving the feeder belts 28 and 29. The shaft 91 also carries a bevel gear 95, which meshes with a bevel pinion 96 keyed to a shaft 97, to which is secured the driving pulleys 25 of the conveyer belts 22 and 23 hereinbefore described. The shaft 97 carries a sprocket 98 connected by a transmission chain 99 to the sprocket 47 of the glue roll operating shaft 46 hereinbefore described. A second sprocket 100 on the shaft 97 is connected by a transmission chain 101 to a sprocket 102 secured to a stub shaft 103. The stub shaft 103 has also secured thereto a sprocket 104 which engages the lower flight of the transmission chain 40 operating the kicker shafts 38 hereinbefore described. By means of the transmission elements above described power is transmitted to the feeder belts 28 and 29, the kicker shafts 39 and the glue rolls or wheels 42.

The shaft 85 disposed along the side of the housing 80 has keyed thereto a pinion 105, which meshes with a superposed gear 106 journalled in a bearing 107, the hub of the gear having clutch teeth 108 formed therein at opposite ends. A cam shaft 109 having a pilot bearing in the gear 106 is journalled at several points along the housing 80 and has a jaw clutch member 110 splined thereon for interengagement with one set of clutch teeth 108 on the gear 106.

Pusher bar operating cams 111 are keyed to the cam shaft 109 and have the general profile shown in Fig. 8 of the drawings. Each of the cams 111 is engageable with a roller tappet lever 112 pivotally mounted in the housing 80, and this tappet lever is in turn engageable with the headed end of a horizontal plunger 113 slidably mounted in a bushing member 114 carried in the side wall of the housing 80 adjacent the pusher bar 55 of the assembling tray 52. A coiled spring 115 surrounds each plunger 113 within the housing 80 to effect the recession of the plunger. The plungers 113 bear at spaced points against the outer side of the pusher bar 55 on the assembling tray 52 and serve to effect the periodic displacement of the pusher bar in the cycle of operation.

Another cam 116 secured to the cam shaft 109 has a rolling engagement with one end of a connecting rod 117, which is pivotally connected at its outer end to the movable clamping member 51 forming in part one wall of the passage 49 from which work pieces enter the assembling tray 52.

The cut-off saw 62 previously noted is mounted on a carriage 118 and is belt driven from an electric motor 119 depending from the carriage. The saw carriage 118 is mounted for horizontal reciprocation on a bracket 120 projecting from the side of the housing 80, and a link 121 is pivotally connected between the carriage and the lower free end of an arm 122 pivotally mounted at its upper end within the casing 80. The arm 122 is provided with a roller 123, which is engaged by a cam 124 on the cam shaft 109 to effect the periodic reciprocation of the saw carriage 118 through the intermediate linkage. A plate 62' is secured to each tray at the edge thereof adjacent the outer end of the pusher bar 55 to form a guard for the saw, as seen in Figs. 3 and 6, and another guard plate 62" is carried by the table 20 adjacent the saw.

In the present instance, the assembling tray is one of a series of trays mounted on the links of an endless chain or belt 125, as more particularly seen in Fig. 4 of the drawings and as hereinafter described. A suitable framework 126 is provided, at opposite ends of which are mounted stationary horizontal arbors 127 disposed in parallel relation, one of these arbors being adjacent the housing 80 and carrying thereon a tubular shaft 128, which has mounted thereon in axially spaced relation a pair of sprockets 129. The tray conveyer chain includes a plurality of pintles 130 which carry rollers 131 at opposite ends engageable in the notches of the spaced sprockets 129 and in the notches of similar spaced sprockets 132 mounted in the arbor 127 at the other end of the framework. Two spaced rows of links 133 are carried by the pintles 130 and each laterally spaced pair of links is provided with pads on which one of the assembling trays 52 is bolted or otherwise firmly secured. The framework 126 includes angle trackways 134, on which the pintle rollers ride to avoid sagging of, and undue tension on, the chain and to keep the trays out of accidental contact.

A shaft 135 has a pilot bearing in the gear 106 on the side thereof opposite the cam shaft 109 and is also journalled in a bearing 136. A jaw clutch member 137 is splined on the shaft 135 for engagement with the adjacent clutch teeth 108 on the gear 106. The jaw clutch members 110 and 137 on the cam shaft 109 and shaft 135, respectively, are connected by a forked shifting member 138 for alternative connection with the gear 106, and a hand lever 139 is operatively connected to the shifting member 138 to effect such alternative connection or the release of both of these shafts from their driving connection. The shaft 135 has keyed thereon a bevel pinion 140, which meshes with a bevel gear 141 carried at one end of a shaft 142, the other end of which carries a pinion 143. The pinion 143 meshes with a gear 144 secured to the tubular shaft 128, on which is mounted the sprockets 129 receiving the tray conveying chain. By this means the tray conveying chain is moved at will alternatively with the operation of the tray-filling mechanism.

A framework 145 partially surrounds the assembling tray 52 in its filling position and carries a pair of bumpers 146, against which the end of the tray bears to take the thrust of the tray during the filling and clamping operations. A latch 147 is operated from a cable 148 and engages the outer side portion of the tray to lock the tray in its proper position during the tray-filling operation. A guide angle 145' is mounted on the frame to lie near and parallel to the outer edge of the tray.

A trip bracket 149 is mounted on the side of the housing 80 in position to engage one arm of the bell crank 76 as the tray ascends to its loading position, thereby effecting the release of the clamping pressure to which the core was subjected during the travel of the tray conveyer and permitting the withdrawal of the core from the tray.

In operation, pieces of waste wood or core blocks 150 of uniform rectangular cross-section and of varying lengths are placed on the travelling feeder belts 28 and 29 passing over the feeder tables 26 and 27. The work pieces 150 are carried by the feeder belts to the entrance of the guide channels above the conveyer belts 22 and 23 and adjacent the kicker wheels 36. The speed of the feeder belts 28 and 29 is such as to crowd the work pieces against the stop angles 35 in order that there will always be an ample supply of work pieces for immediate entrance into the guide channels above the conveyer belts 22 and 23. At this point the work pieces are carried along these latter conveyer belts and are assisted in their travel therealong by the kicker wheels 37, which place the stream of work pieces in the guide channels in close tandem relation. From the conveyer belts 22 and 23 the work pieces are discharged across the gluing platform 41, where they are laterally pressed by the spring-urged rollers 44 into engagement with the glue-carrying beveled peripheries of the glue rolls or wheels 42, thereby applying a coat of glue to one side face of each work piece. From the gluing platform the glue-coated work pieces are urged by their followers into the converging guide channels formed by the guide angles 48 from which channels the work pieces enter the passage or throat 49. At this point the two now contiguous rows of work pieces may be placed under a slight lateral pressure in order to cause their adhesion and these two rows of work pieces are then projected in a rapid stream onto the table 53 of the assembling tray 52. When these rows abut against the stop strip 54 at the opposite side of the table the progress of these rows is stopped and shortly thereafter the cam 116 on the cam shaft 109, which is now placed in operation, acts through the link 117 to move the clamping member 51 and thereby firmly clamp the two rows of work pieces in the channel or throat 49. Following this operation the saw carriage 118 is reciprocated by means of the cam 124 on the cam shaft 109 and the circular saw 62 thereupon cuts off the ends of the work pieces projecting from the adjacent edge of the tray. The saw carriage is thereupon retracted and the pusher bar 55 is operated by means of the plungers 113 and cams 111 to laterally displace these rows of work pieces. In their lateral movement these work pieces raise the guide strip 69 under which they pass and the foremost row now laterally engages the follower 65, which keeps the work pieces in alignment. The pusher bar 55 is then retracted by means of the springs 61, and the clamping member 51 of the clamping passage 49 is then released to permit another double row of work pieces to be rapidly projected onto the tray table. The above noted sequence of operations is then repeated and the rows of work pieces pass beneath the pressure strips or bars 64, under which they are frictionally retained. If for any reason it is desirable to stop the operation of the cam shaft 109 during the filling operation this can be done by placing the shifting lever 139 in its neutral position without stopping other rotating shafts.

During the tray-filling operation the end thrust on the tray is taken by the bumpers 146 and when the tray is filled the follower bar 65 contiguous with the foremost row of work pieces is urged against the spring plungers 71, displacing these to impose and limit the clamping pressure. As hereinbefore described, some of the spring plungers 71 on their displacement serve to swing the bell cranks 76 through intermediate linkage comprising a connecting rod 75 and a lever 74. The angular displacement of each bell crank 76 effects the upward projection of the connected locking pin 77 which enters the locking bore or recess 78 in the pusher bar 55, thereby firmly locking the contents of the tray in place. The pusher bar operating plungers 62 are then withdrawn by their springs 114 and immediately thereafter the cam shaft 109 is stopped in operation by manipulation of the shifting lever 139.

The latch 147 is then released by means of its cable 148 to free the now-filled tray 52 from the frame 145, and the tray conveyer chain 125 is then set in motion by operatively connecting it to the gear 106, this being accomplished by manipulating the shifting lever 139 in a direction to engage the clutch member 137 with the clutch teeth 108 on the gear. The tray conveyer is left in operation just a sufficient length of time to elevate the now-filled tray and to place in filling position the next succeeding tray, which is then retained by the latch 147.

Succeeding trays are filled with work pieces in a manner similar to that just described, and the work pieces in the filled trays during the travel of the trays back to their original position are kept under pressure sufficiently long to permit the glue to set. Just before each tray again reaches its filling position an elongated arm of one of the bell cranks 76 on the tray strikes a trip bracket 149 carried on the housing 80, thereby swinging the bell crank to effect the release of the locking pin 77 on the pusher bar 55 and permitting the core to be slid off the tray. The finished cores are set aside to dry, after which they are sawed into various widths according to requirements.

It will be understood that the work pieces forming the core may be of various lengths, and that the term "row of work pieces," as applied to the work pieces on the tray, may indicate a single work piece of suitable length.

By means of this invention the manufacture of core blocks for woodwork purposes can be carried out in an economical, rapid and expedious manner, eliminating much of the hand labor which was previously needed in the manufacture of these articles.

What I claim as new and desire to secure by Letters Patent is:

1. In a core block assembling machine, the combination of a tray, means for feeding successive rows of work pieces onto said tray, and means for intermittently laterally displacing said rows on the tray to provide room for succeeding rows.

2. In a core block assembling machine, the combination of a tray receiving laterally adjacent glue-coated work pieces, and means for intermittently laterally displacing said work pieces on the tray to provide room for succeeding work pieces.

3. In a core block assembling machine, the combination of a tray, and means for simultaneously placing on said tray a plurality of rows of work pieces.

4. In a core block assembling machine, the combination of a tray, means for guiding a row of work pieces onto said tray, and means for laterally gluing said work pieces while they are in transit to said tray.

5. In a core block assembling machine, the combination of a support having a guide channel along which a row of work pieces are fed, a tray receiving a row of work pieces projected from said channel, a cut-off saw movable between said tray and said channel to sever a work piece connecting said channel and tray after reception of a row of work pieces on said tray, clamping means acting on the work piece being severed by said saw, and means for laterally displacing a row of work pieces on said tray to permit reception of a succeeding row.

6. In a core block assembling machine, the combination of a tray receiving adjacent rows of glue-coated work pieces, a presser member for laterally compressing said rows of work pieces into lateral adhesion to form a core, and locking means controlled by the clamping pressure for retaining the core under compression after the withdrawal of the presser member.

7. In a core block assembling machine, the combination of a tray receiving adjacent rows of glue-coated work pieces and having resilient abutments thereon, a pusher member for urging successive laterally adjacent rows of work pieces towards said resilient abutments, actuating means for reciprocating said pusher member, locking means interengageable between said pusher member and tray, and means operated by the displacement of said resilient abutments when the work piece rows are placed under lateral compression by the reaction of said abutments for effecting the retention of said pusher member in compressing position.

8. In a core block assembling machine, the combination of a tray on which laterally adjacent rows of glue-coated work pieces are placed, resiliently mounted pressing means spaced above said tray for holding subjacent work pieces in engagement with said tray, and displacing means for moving successive rows of work pieces laterally under said pressing means.

9. In a core block assembling machine, the combination of a tray on which laterally adjacent rows of glue-coated work pieces are placed, a support mounted on said tray and spaced thereabove, a pressing member interposed between said support and tray in spaced relation to said tray and carried by said support, springs urging said pressing member toward said tray, and displacing means for moving successive rows of work pieces laterally under said pressing member for effecting the frictional retention of said work pieces.

10. In a core block assembling machine, the combination of a tray on which laterally adjacent rows of work pieces are placed, means for laterally displacing successive rows of work pieces after their placement on said tray, a follower bar against which the foremost row of work pieces is engageable in its lateral displacement, and spring-urged means for effecting the frictional retardation of said follower bar.

11. In a core block assembling machine, the combination of a tray on which laterally adjacent rows of work pieces are placed, means for laterally displacing successive rows of work pieces after their placement on said tray, a follower bar against which the foremost row of work pieces is engageable in its lateral displacement, spring-urged means for effecting the frictional retardation of said follower bar, and means for manually releasing the friction on said follower bar to permit the free displacement of said bar on said tray.

12. In a core block assembling machine, the combination of a plurality of movable trays, means for locking said trays successively in filling position, and means for filling said trays with work pieces when in filling position.

13. In a core block assembling machine, the combination of an endless carrier, a plurality of trays mounted on said carrier, means for filling successive trays with contiguous rows of work pieces, and means for locking the filled trays to place the work pieces under lateral compression.

14. In a core block assembling machine, the combination of an endless carrier chain, spaced rotary members on which said chain is supported and moved, a plurality of trays mounted on said carrier chain and movable therewith to a filling position, means for filling successive trays with work pieces, and means for clamping each tray after the filling operation.

15. In a core block assembling machine, the combination of an endless carrier, a plurality of trays mounted on said carrier, means for filling successive trays with contiguous rows of work pieces, means for locking the filled trays to place the work pieces under lateral compression, and means for successively releasing the cores on said trays preceding the arrival of each tray to filling position.

16. In a core block assembling machine, the combination of a tray, means for placing successive rows of work pieces on said tray, and cam-operated reciprocable pushing means for laterally displacing successive rows of work pieces and for placing said work pieces under lateral compression when the tray is filled.

17. In a core block assembling machine, the combination of a tray on which successive rows of glue-coated work pieces are placed, a laterally movable pusher bar reciprocably mounted on said tray for effecting the lateral displacement of successive rows of work pieces, means for periodically effecting the reciprocation of said pusher bar, said pusher bar having locking recesses, and locking members carried by said tray and engageable into said pusher bar recesses in the forward position of said pusher bar to retain the filled tray of work pieces in lateral compression.

18. In a core block assembling machine, the combination of a tray receiving successive rows of work pieces, reciprocable pushing means for laterally displacing successive rows of work pieces to provide space for successive rows, and pivotally mounted guiding means having parts disposed at the side of the newly introduced row of work pieces remote from said pushing means to prevent toppling of said work pieces, said guiding means being urged upwardly out of the way during the displacement of said row of work pieces by said pushing means.

19. In a core block assembling machine, the combination of a channel out of which work pieces are fed in a row, a tray movable into register with said channel to receive work pieces therefrom, and latching means for retaining said tray and channel in registering relation.

20. In a core block assembling machine, the combination of a carrier having a plurality of trays mounted thereon successively movable to a filling position, means for placing laterally contiguous rows of work pieces on said trays when in filling position, means for placing a filled tray of work pieces under compression in a direction lateral with respect to the movement of the carrier, and abutment means engageable by the tray in its filling position for relieving said carrier of lateral stress during the compressing operation.

21. In a core block assembling machine, the combination of a conveyer belt, guide means disposed longitudinally of the belt for confining therein a row of work pieces to be transported by said belt, a tray onto which said work pieces are discharged, and propelling means disposed above said belt for urging the work pieces thereon in close tandem relation.

22. In a core block assembling machine, the combination of a conveyer belt, guide means disposed longitudinally of the belt for confining therein a row of work pieces to be transported by said belt, a tray onto which said work pieces are discharged, propelling means disposed above said belt for urging the work pieces thereon in close tandem relation, and a feeding conveyer extending laterally of said belt for laterally urging work pieces onto said belt and under said propelling means.

23. In a core block assembling machine, the combination of a conveyer belt, guide means disposed longitudinally of the belt for confining therein a row of work pieces to be transported by said belt, a tray onto which said work pieces are discharged, and a propelling wheel disposed above said belt and having peripheral projecting portions for urging the work pieces thereon in close tandem relation.

24. In a core block assembling machine, the combination of a table having a pair of spaced channels along each of which work pieces are fed in a row, means for laterally glue-coating said work pieces in their passage through said channels, a common channel receiving said two rows of work pieces in laterally adjacent relation, and a tray receiving said rows of work pieces discharged from said common channel.

25. In a core block assembling machine, the combination of a support having a channel along which a row of work pieces are fed, a rotary member engageable laterally with said work pieces for applying a coat of glue thereto, resilient means for urging said work pieces laterally against said member, and a tray onto which said glue-coated work pieces are fed.

26. In a core block assembling machine, the combination of a carrier having a plurality of trays thereon successively movable to filling position, means for intermittently moving said carrier, a channel from which work pieces are intermittently fed in a row onto the tray in filling position, cam-operated means for controlling the placement of successive rows of work pieces on said tray, and means for controlling said cam-operated means and said carrier-moving means in alternative relation.

In testimony whereof I affix my signature.

NATHAN PAINE.